(12) United States Patent
Daoud

(10) Patent No.: US 6,268,565 B1
(45) Date of Patent: Jul. 31, 2001

(54) CABLE SEAL FOR SUBMERGED ENCLOSURES

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/455,612

(22) Filed: Dec. 6, 1999

(51) Int. Cl.[7] ........................................ H02G 3/18
(52) U.S. Cl. .................. 174/65 SS; 174/65 R; 285/161; 439/98
(58) Field of Search .................. 174/51, 65 SS, 174/65 R, 78; 285/161, 354, 322, 343, 348; 439/583, 98

(56) References Cited

U.S. PATENT DOCUMENTS

| | | | |
|---|---|---|---|
| 4,169,967 | * 10/1979 | Bachle | 174/65 SS |
| 5,621,191 | * 4/1997 | Norris et al. | 174/65 SS |
| 5,648,639 | * 7/1997 | Hand | 174/51 |
| 5,766,037 | * 6/1998 | Nelson | 439/583 |
| 5,857,716 | * 1/1999 | Thomas | 285/348 X |
| 5,920,035 | * 7/1999 | Haney et al. | 174/65 SS |
| 5,934,937 | * 8/1999 | McCarthy | 439/583 |
| 6,034,325 | * 3/2000 | Nattel et al. | 174/59 |

* cited by examiner

*Primary Examiner*—Dean A. Reichard
*Assistant Examiner*—Dhiru R Patel
(74) *Attorney, Agent, or Firm*—Stroock & Stroock & Lavan LLP

(57) ABSTRACT

A cable sealing arrangement is provided for limiting the ingress of fluid into a location about a cable, such as a telephone wire enclosure, which generally includes a fitting, two sealing members, and two nuts. The sealing arrangement provides multiple redundant seals defined by the interfaces of tapered surfaces on the sealing members and the fitting, as well as, the interfaces of tapered surfaces on the sealing members and the nuts. By tightening the nuts onto the fitting, the nuts cause compression of the sealing members resulting in tight engagement of a cable.

22 Claims, 5 Drawing Sheets

CABLE SEAL FOR SUBMERGED ENCLOSURES

FIELD OF THE INVENTION

This invention relates to sealing arrangements and, more particularly, to sealing arrangements for preventing the ingress of fluid into a location about a cable, such as into a telephone wire enclosure.

BACKGROUND OF INVENTION

Extensive numbers of telephone wire enclosures are located in harsh environmental settings, including sub-grade locations that are under water or susceptible to flooding. Fluid is prevalent in these settings, and there is great concern in preventing the ingress of fluid into the enclosures, which may denigrate, or altogether destroy, the telephone wire connections within the enclosure. The concern is even greater where fiber optic cables are used.

One of the most susceptible locations for fluid ingress is about a cable at the point of entry of the cable into the enclosure. To restrict the ingress of fluid into an enclosure at a cable's point of entry, seals have been used in the prior art. The various prior art seals provide different degrees of sealing over extended periods of time, depending upon such factors as the extent of plastic deformation caused by changes in temperature, excessive and/or uneven stresses, etc.

SUMMARY OF THE INVENTION

To overcome shortcomings in the prior art, a sealing arrangement is provided for use with a cable at a location where the ingress of fluid about the cable is a concern, such as at the point of entry into a telephone wire enclosure. The sealing arrangement preferably has multiple sealing interfaces which define multiple redundant seals. The multiple sealing interfaces restrict the ingress of fluid into the location about the cable at the point of entry of the cable into the location. As used herein, a "cable" can be any of standard copper cables, fiber optic cables or cables of other construction and/or materials.

The sealing arrangement generally comprises a fitting, two sealing members, and two nuts. The sealing members are formed to be at least partially disposed in the fitting, with the nuts being used to tighten against the sealing members and enhance the sealing ability of the arrangement.

The fitting has a passageway extending therethrough, which is preferably generally venturi-shaped, with two tapered converging portions being disposed end-to-end. Also, the sealing members are each formed with a channel, dimensioned to allow the passage therethrough of the cable, and, preferably, a tapered fitting engaging portion. With the sealing members being seated in the passageway, the channels of the sealing members are generally coaxially aligned, and the tapered fitting engaging portions of the sealing members respectively contact the tapered converging portions of the passageway to define two sealing interfaces. With at least two sealing interfaces, and a cable passing through the channels of the sealing members, the ingress of fluid into an enclosure about the cable can be reduced.

Additionally, the sealing members can respectively be formed with tapered nut engaging portions. The nuts are preferably each formed with a ramped smooth compression surface for pressing against the tapered nut engaging surface of one of the sealing members to cause compression thereof upon being tightened onto the fitting. The interfaces of the respective compression surfaces and the nut engaging surfaces provide additional seals in the arrangement which limit the amount of fluid that can migrate about a cable.

The compression of the sealing members by the nuts causes distortion of the sealing members. With the sealing members being in abutting contact and/or due to the angled interfaces of the fitting engaging portions and the converging portions of the passageway of the fitting, the sealing members have limited ability to expand axially and, thus, are restricted to expanding radially. Through radial expansion, the sealing members more tightly press against the cable and the fitting, and cause better sealing about the cable.

With the structural arrangement of the subject invention, not only is a tight seal obtained about a cable, but also tight, redundant seals are defined at interfaces about the cable at a location, such as the point of entry into an enclosure. The arrangement advantageously may be fluid tight to limit the ingress of fluid about the cable into the location.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
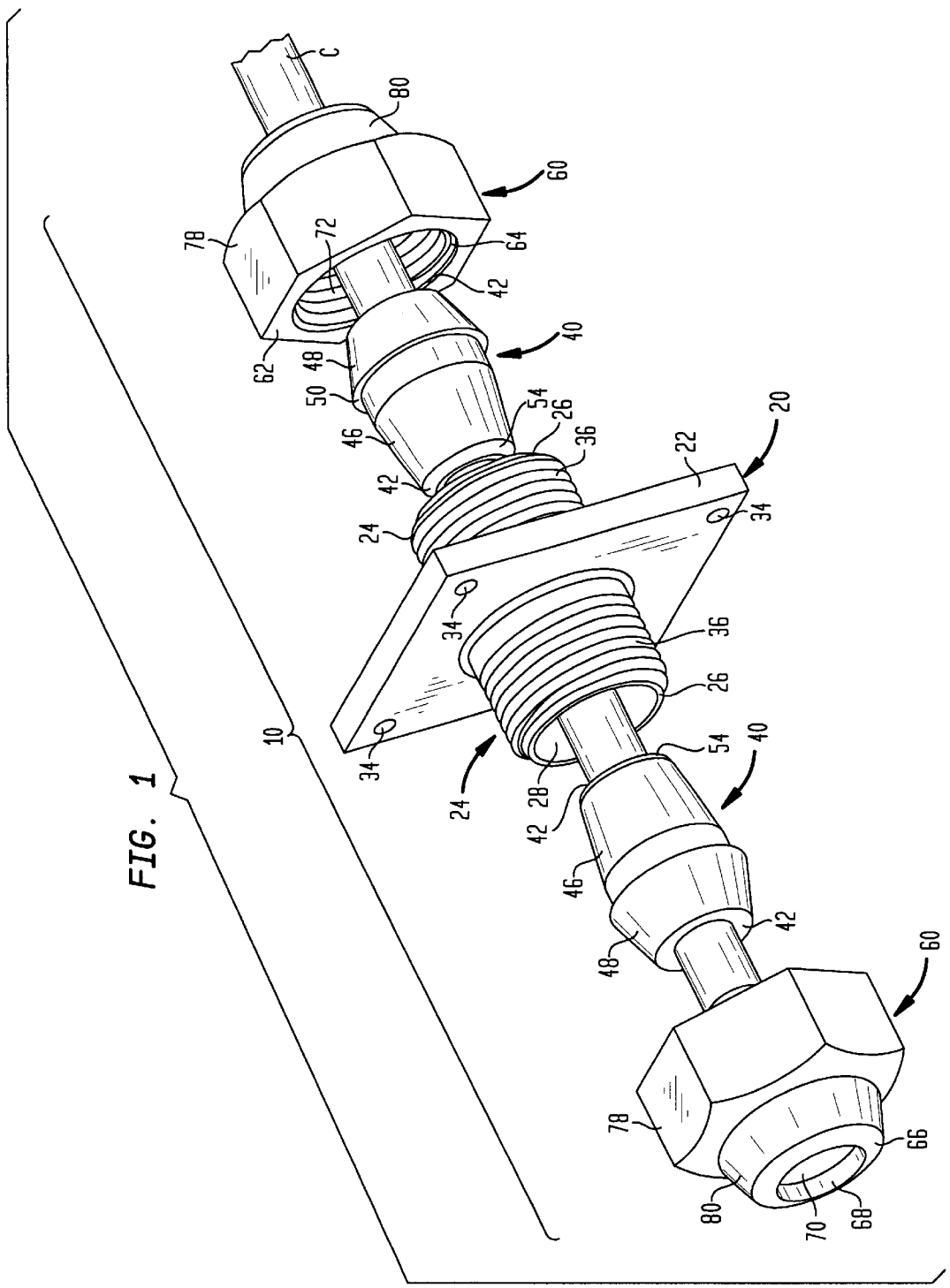
FIG. 1 is an exploded perspective view of the sealing arrangement of the subject invention.
Figure 2:
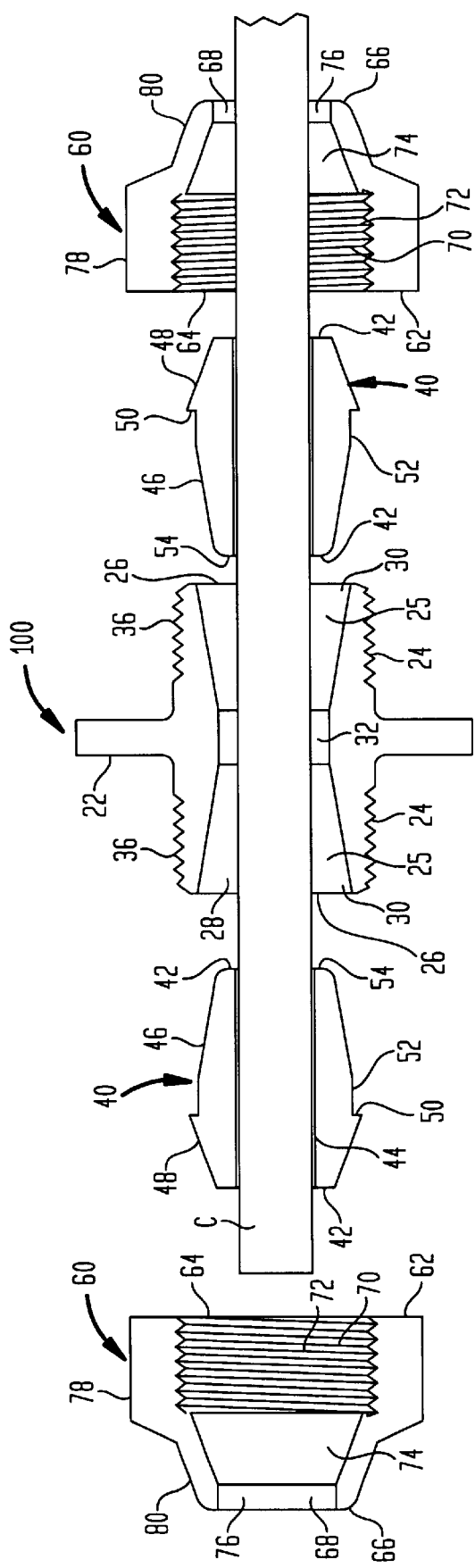
FIG. 2 is an exploded cross-sectional view of the sealing arrangement.
Figure 3:
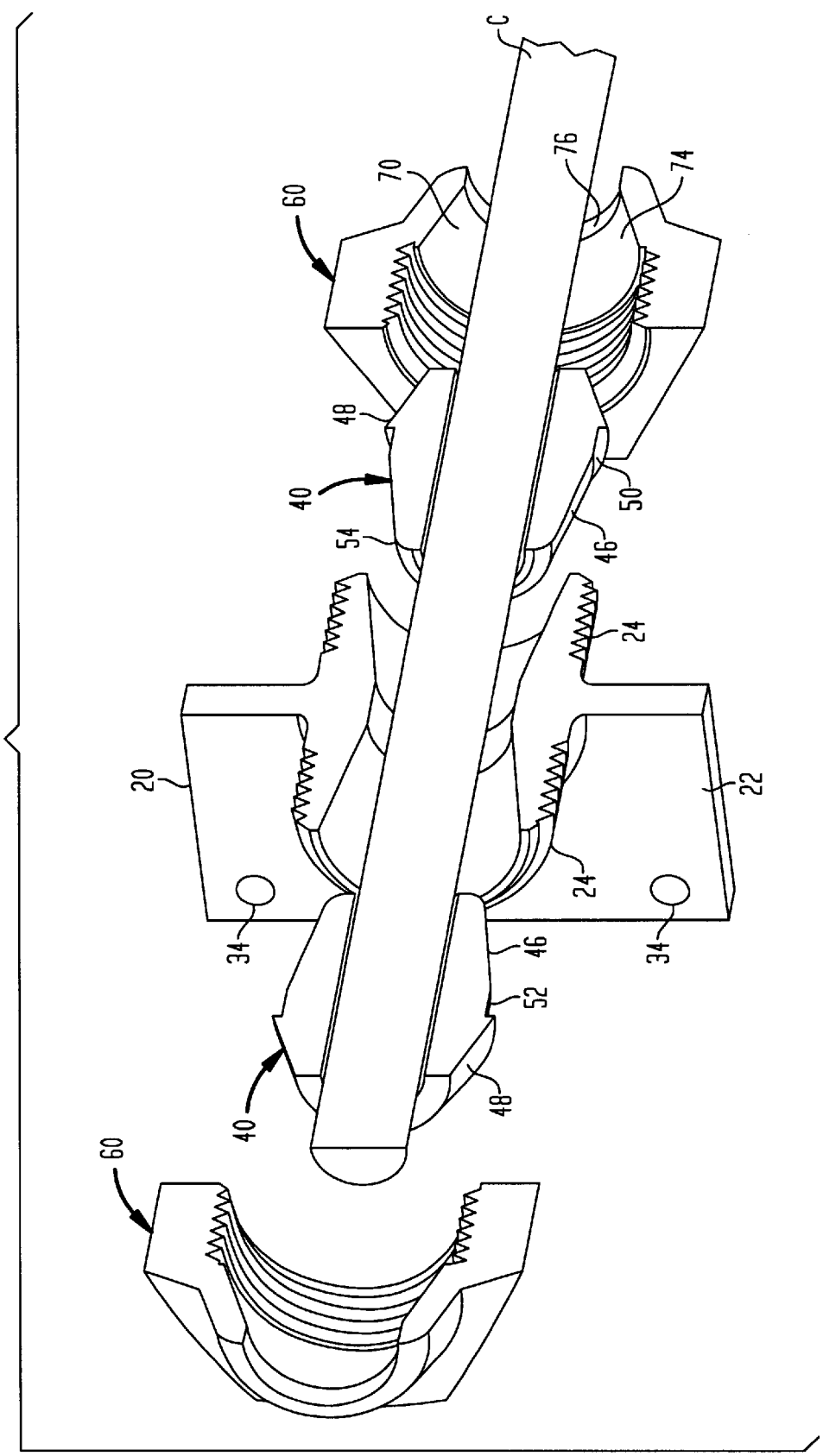
FIG. 3 is an exploded, perspective cross-sectional view of the sealing arrangement.

Referring to FIGS. 1–3, a cable sealing arrangement 10 is shown for forming a seal about a cable C. The sealing arrangement 10 generally includes a fitting 20, sealing members 40, and nuts 60.

The fitting 10 includes a flange 22 from which preferably extend two protrusions 24 in generally opposite directions. Each protrusion 24 defines a free protrusion end 26 spaced from the flange 22. A passageway 28, which is preferably generally venturi-shaped, extends between and through the protrusion ends 26 to define a chamber 25 within each of the protrusions 24. The chambers 25 are in fluid communication. The preferred venturi-shape provides the passageway 28 with tapered converging portions 30 that are end-to-end and that flare outwardly towards the protrusion ends 26. It is also preferred that the passageway 28 define a straight, generally constant cross-sectional portion 32 between the converging portions 30 so as to define clearance therebetween. Alternatively, although not shown, the converging portions 30 can be arranged in contiguous fashion such that there is no clearance between the converging portions 30.

The flange 22 facilitates mounting the fitting 20 to a desired location. To further enhance the ability to mount the flange 22, and thus the fitting 20, mounting holes 34 are formed therein. Further, to enable mounting of the nuts 60 onto the protrusions 24, it is preferred that the protrusions 24 each have a threaded outer surface 36 extending from its respective protrusion end 26. It is also preferred that the threads of the two outer surfaces 36 be reversed so that reverse torques are required to mount the nuts 60 onto the fitting 20.

The sealing members 40 are each unitarily formed from any resilient material known to those skilled in the art that may be used to form a seal in a fairly harsh and wet environment. Two of the sealing members 40 are used, whereby the number of sealing members corresponds to the number of protrusions 24.

Each of the sealing members 40 is formed with two axial ends 42 and a channel 44 that extends between and through the ends 42. The channel 44 is sized to allow the passage therethrough of the cable C and can be formed to define varying degrees of clearance about the cable C, or interference. It should be noted that the sealing members 40 must be threaded onto the ends (not shown) of the cable C and slid the length thereof into position in the fitting 20; thus, an excessively tight fit between the sealing members 40 and the cable C will result in a strenuous effort in mounting the sealing members 40 in the sealing arrangement 10.

Preferably, each of the sealing members 40 is formed with a tapered fitting engaging portion 46 and a tapered nut engaging, portion 48 respectively defined in proximity to the ends 42. It is preferred that the taper of the nut engaging portions 48 be greater than the taper of the fitting engaging portions 46. The difference in taper can be used to define a flat face, such as the annular face 50. The degree of taper of the fitting engaging portions 46 is preferably equal to the degree of taper of the converging portions 30. A constant cross-section portion 52 may be formed on each of the sealing members 40 on external portions thereof, disposed between the fitting engaging portion 46 and the nut engaging portion 48. Finally, an edge 54 of both of the sealing members 40 can be rounded, chamfered, or broken in other manners known to those skilled in the art, so as to avoid having a sharp right corner.

The nuts 60 each have a first end 62, with a large opening 64 being defined therein, and a second end 66, with a small opening 68 being defined therein. A passage 70 extends between the first and second ends 62, 66 to communicate the large opening 64 with the small opening 68. The passage 70 is partially threaded to define an inner threaded portion 72 formed to threadedly engage the threaded outer surface 36 of one of the protrusions 24. Disposed between the second end 66 and the inner threaded portion 72 is a smooth ramped compression surface 74 that has generally the same diameter as the inner threaded portion 72 and converges toward the small opening 68. The degree of taper of the compression surface 74 is preferably equal to the degree of taper of the nut engaging surfaces 48 of the sealing members 40.

To reduce the possibility of the cable C fraying, it is preferred that straight portions 76 extend into the nuts 60 from the small openings 68, rather than sharp, thin edges be used to define the small openings 68. Additionally, in a preferred embodiment, the nuts 60 are externally each formed with a polygonal cross-section portion 78, such as a hexagonal cross-section, shaped to be engaged by a standard tool for tightening the respective nut, such as a wrench, and with a frustoconical portion 80 about the small opening 68. Although not shown, as an alternative, the frustoconical portion 80 may be formed hemispherically. The frustoconical portion 80 beneficially eliminates the formation of an outwardly facing right angle that may damage the cable C.

Figure 4:
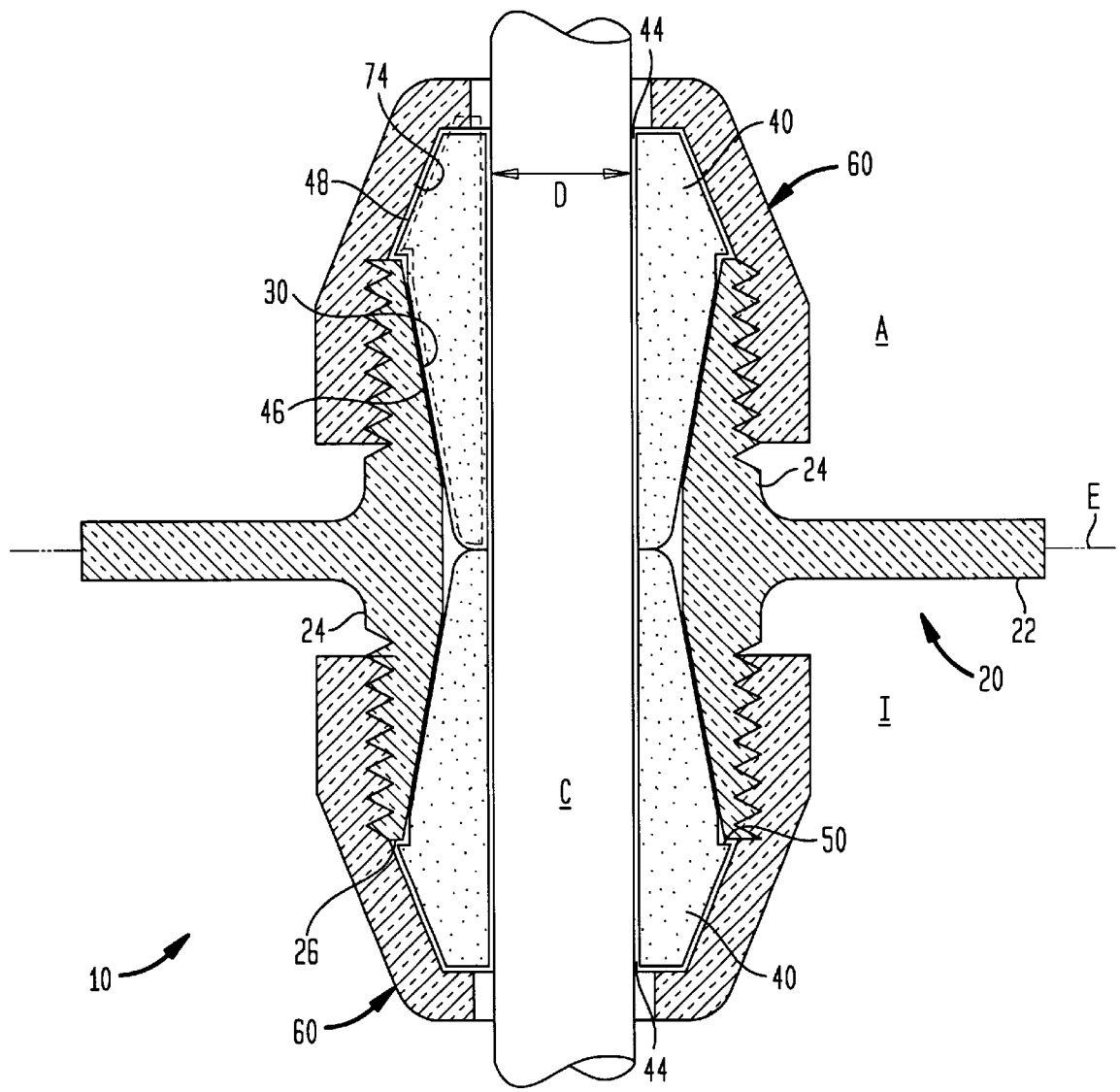
FIG. 4 is a cross-sectional view of the sealing arrangement assembled about a cable and mounted at the point of entry of the cable into a telephone wire enclosure; and, FIG. 5 is a cross-sectional view of a second embodiment of the sealing arrangement assembled about a cable and mounted at the point of entry of the cable into a telephone wire enclosure.

Referring to FIG. 4, the sealing arrangement 10 is used in a location where the ingress of fluid is a concern, such as an enclosure E. The sealing arrangement 10 limits the ingress of fluid from the open atmosphere A, external of the enclosure E, to the interior I of the enclosure E, about the cable C. In use, the fitting 20 is mounted to the enclosure E using the flange 22. Thereafter, it is preferred that the cable C be fed through the passageway 28, and, the sealing members 40 be slid down the length of the cable C with the cable C being seated within the channels 44. The sealing members 40 are slid into contact with the converging portions 30 of the fitting 20 such that the sealing members 40 are at least partially disposed within the protrusions 24. Additionally, the channels 44 are in fluid communication and, preferably, generally coaxially aligned in the arrangement.

The nuts 60 are also threaded over the cable C and caused to come into threaded engagement with the protrusions 24 as shown in FIG. 4. With the nuts 60 mounted onto the fitting 20, the compression surfaces 74 preferably come into contact with the nut engaging portions 48. Since the compression surfaces 74 are in bearing contact with the nut engaging portions 48, the chambers 25 are constricted upon tightening the nuts 60 onto the fitting 20 (thereby causing translation of the nuts 60 towards the flange 22), and the sealing members 40 are caused to be compressed. With the sealing members 40 being disposed end-to-end, the sealing members 40 may be in abutting contact. Due to the abutting contact and/or since the sealing members 40 define angled interfaces with the converging portions 30, axial elongation of the sealing members 40 due to compression is limited. Accordingly, the applied compressive forces cause radial distortion of the sealing members 40. To illustrate this point, dashed lines in FIG. 4 represent an uncompressed state of the sealing members 40, wherein the sealing members 40 are longer in length and smaller in cross-sectional thickness. Upon being compressed, the sealing members 40 are foreshortened and caused to have larger cross-sections. Advantageously, the increase in cross-section translates to a reduction in size in at least portions of the channels 44. In other words, diameter D of the channels is reduced under compression, thus causing the sealing members 40 to more tightly press against the cable C and define a better seal. Also, the sealing members 40 press more tightly against the fitting 20. The tight pressing may define fluid tight seals about the cable C.

In addition, preferably the fitting engaging portions 46 define sealing interfaces with the converging portions 30, whereas, the nut engaging portions 48 define sealing interfaces with the compression surfaces 74. All told, at least four redundant sealing interfaces are formed about the cable C in addition to the tight engagement of the cable C by the sealing members 40. Depending also on the extent of compression, the annular faces 50 may define sealing interfaces with the protrusion ends 26.

Figure 5:
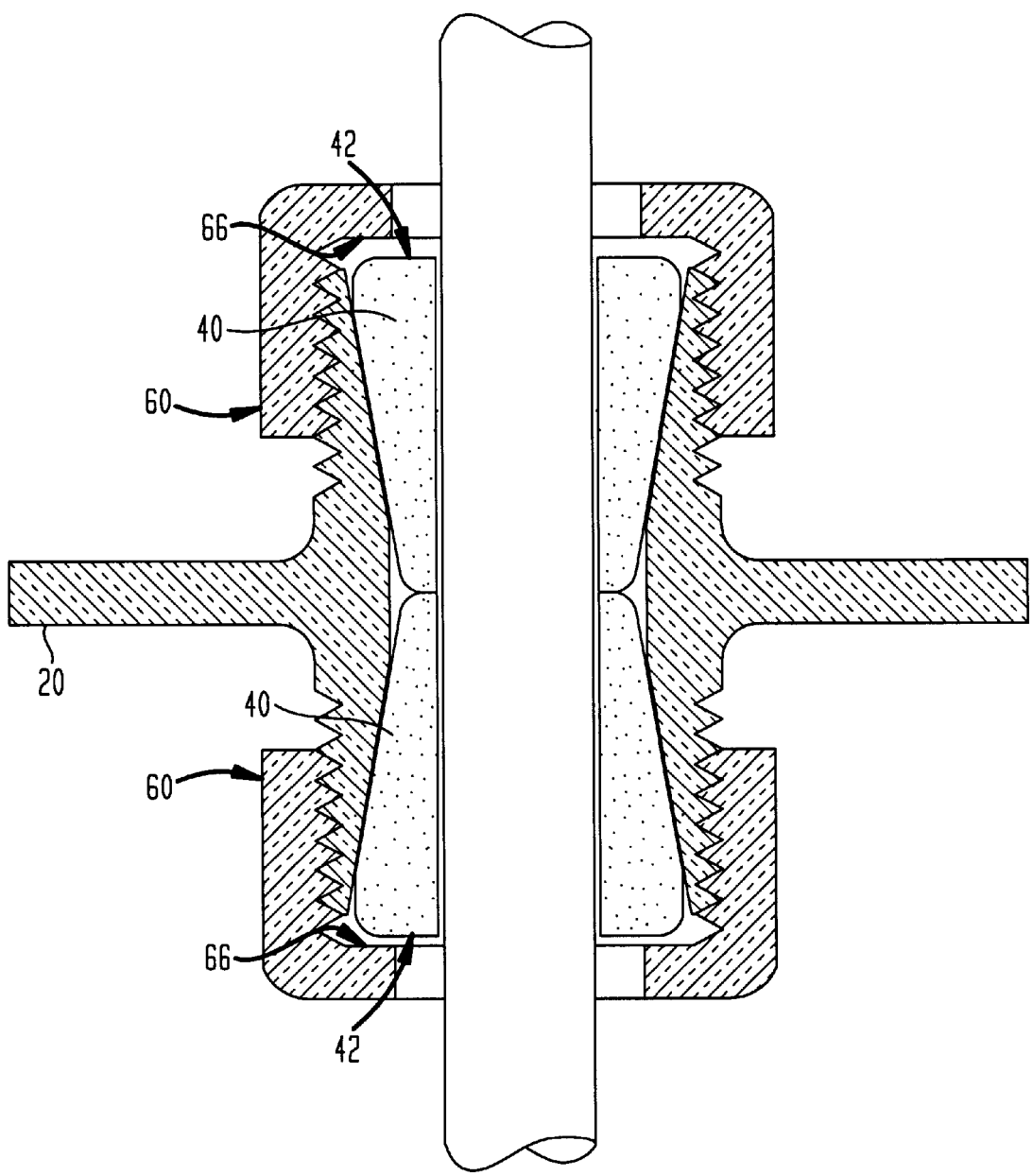

FIG. 5 depicts a second embodiment of the invention, wherein the sealing members 40 are not formed with tapered nut engaging portions 48, and the nuts 60 are not formed with compression surfaces 74. Rather, the first ends 66 of the nuts 60 directly engage ends 42 of the sealing members 40 in causing compression thereof. Here, the first ends 66 and the ends 42 define sealing interfaces.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A cable sealing arrangement comprising:

a fitting having first and second axial ends and a passageway extending therebetween, said passageway having a first tapered portion in proximity to said first axial end and a second tapered portion in proximity to said second axial end; and, first and second sealing members, each said sealing member having first and second sealing ends, a channel, sized to allow the passage therethrough of a cable, extending between and through said first and said second sealing ends, and a tapered fitting engaging portion being defined in proximity to said first sealing end, wherein said first sealing member is at least partially disposed in said fitting with respective said fitting engaging portion being in contact with said first tapered portion, said second sealing member is at least partially disposed in said fitting with respective said fitting engaging portion being in contact with said second tapered portion, and said channel of said first sealing member being substantially coaxially aligned with said channel of said second sealing member.

2. A cable sealing arrangement as in claim 1 further comprising first and second nuts formed to threadedly mount onto said fitting.

3. A cable sealing arrangement as in claim 2, wherein tightening of said first nut onto said fitting causes compression of said first sealing member, tightening of said second nut onto said fitting causes compression of said second sealing member, said compressions resulting in reductions in size in at least portions of said channels of said sealing members.

4. A cable sealing arrangement as in claim 3, wherein each of said sealing members has a tapered nut engaging surface in proximity to respective said second sealing end.

5. A cable sealing arrangement as in claim 4, wherein nuts each having first and second nut ends, a first opening in said first nut end, a second opening in said second nut end, a passage extending between and communicating said first and second openings, and a ramped portion defined within said passage and in proximity to said second nut end, said ramped portion converging towards said second opening, wherein said nut engaging surface of said first sealing member is in contact with said ramped portion of said first nut, and said nut engaging surface of said second sealing member is in contact with said ramped portion of said second nut.

6. A cable sealing arrangement as in claim 2, wherein each of said sealing members has a tapered nut engaging surface in proximity to respective said second sealing end.

7. A cable sealing arrangement as in claim 6, wherein nuts each having first and second nut ends, a first opening in said first nut end, a second opening in said second nut end, a passage extending between and communicating said first and second openings, and a ramped portion defined within said passage and in proximity to said second nut end, said ramped portion converging towards said second opening, wherein said nut engaging surface of said first sealing member is in contact with said ramped portion of said first nut, and said nut engaging surface of said second sealing member is in contact with said ramped portion of said second nut.

8. A cable sealing arrangement as in claim 1, wherein a flange extends from said fitting.

9. A cable sealing arrangement as in claim 1, wherein said first sealing ends of said sealing members have broken edges.

10. A cable sealing arrangement as in claim 1, wherein the taper of said converging portions is substantially equal to the taper of said fitting engaging portions.

11. A cable sealing arrangement as in claim 1, wherein said first and second sealing members are in abutting contact.

12. A cable sealing arrangement comprising:

a fitting having first and second axial ends and a passageway extending therebetween and therethrough; and, first and second sealing members, each said sealing member having first and second sealing ends, and a channel, sized to allow the passage therethrough of a cable, extending between and through said first and said second sealing ends, wherein said first sealing member and said second sealing member are at least partially disposed in said passageway of said fitting with said channel of said first sealing member being substantially coaxially aligned with said channel of said second sealing member; and, first and second nuts threadedly mounted on said fitting such that tightening of said first nut causes compression of said first sealing member and such that tightening of said second nut causes compression of said second sealing member, said compressions resulting in reductions in sizes in at least portions of said channels of said sealing members.

13. A cable sealing arrangement as in claim 12, wherein each of said sealing members has a tapered nut engaging surface in proximity to respective said second sealing end.

14. A cable sealing arrangement as in claim 13, wherein said nuts each having first and second nut ends, a first opening in said first nut end, a second opening in said second nut end, a passage extending between and communicating said first and second openings, and a ramped portion defined within said passage and in proximity to said second nut end, said ramped portion converging towards said second opening, wherein said nut engaging surface of said first sealing member is in contact with said ramped portion of said first nut, and said nut engaging surface of said second sealing member is in contact with said ramped portion of said second nut.

15. A cable sealing arrangement as in claim 14, wherein said compressions being caused by bearing contact between respective said nut engaging portions and said ramped portions.

16. A cable sealing arrangement as in claim 12, wherein said first and second sealing members are in abutting contact.

17. A cable sealing arrangement as in claim 12, wherein angled interfaces are respectively defined between said first sealing member and said fitting, and between said second sealing member and said fitting.

18. A cable sealing arrangement as in claim 12, wherein said compressions cause radial expansions of said sealing members.

19. A cable sealing arrangement comprising:

a fitting having first and second axial ends and a passageway extending therebetween and therethrough; and, first and second sealing members, each said sealing member having first and second sealing ends, a channel, sized to allow the passage therethrough of a cable, extending between and through said first and said second sealing ends, and a tapered nut engaging portion defined in proximity to said second end, wherein said first sealing member and said second sealing member are at least partially disposed in said passageway of said fitting with said channel of said first sealing member being substantially coaxially aligned with said channel of said second sealing member; and, first and second nuts threadedly mounted on said fitting, each said nut having first and second nut ends, a first opening in said first nut end, a second opening in said second nut end, a passage extending between and communicating said first and second openings, and a ramped portion defined within said passage in proximity to said second nut end, said ramped portion converging towards said second opening, wherein said nut engaging portion of said first sealing member is in contact with said ramped portion of said first nut, and said nut engaging portion of said second sealing member is in contact with said ramped portion of said second nut.

20. A cable sealing arrangement as in claim 19, wherein the taper of said ramped portions is substantially equal to the taper of said nut engaging portions.

21. A cable sealing arrangement as in claim 19, wherein said first and second sealing members are in abutting contact.

22. A cable sealing arrangement comprising:

a first chamber having an interior;

a second chamber having an interior in fluid communication with said first chamber interior;

a first sealing member adapted for shape mating engagement with said first chamber interior and having a first channel extending therethrough;

a second sealing member adapted for shape mating engagement with said second chamber interior and having a second channel extending therethrough;

a first nut disposed around said first chamber interior adapted for tightening about said first chamber so as to cause said first chamber to constrict and to exert constrictive pressure on said first scaling member to an extent sufficient to cause a fluid tight seal between said first scaling member and a first portion of a cable inserted within said first channel, and between said first scaling member and said first chamber interior; and, a second nut disposed around said second chamber interior adapted for tightening about said second chamber so as to cause said second chamber to constrict and to exert constrictive pressure on said second sealing member to an extent sufficient to cause a fluid tight seal between said second scaling member and a second portion of a cable inserted within said second channel, and between said second sealing member and said second chamber interior.

* * * * *